April 29, 1930. F. KONN 1,756,867

CONTROL SYSTEM FOR ALTERNATING CURRENT COMMUTATOR MACHINES

Filed Feb. 4, 1929

Inventor:
Felix Konn,
by Charles E. Tullar
His Attorney.

Patented Apr. 29, 1930

1,756,867

UNITED STATES PATENT OFFICE

FELIX KONN, OF ERIE, PENNSYLVANIA, ASSIGNOR TO GENERAL ELECTRIC COMPANY, A CORPORATION OF NEW YORK

CONTROL SYSTEM FOR ALTERNATING-CURRENT COMMUTATOR MACHINES

Application filed February 4, 1929. Serial No. 337,210.

My invention relates to single phase alternating current commutator machines and has for its object the provision of simple and reliable means to improve the commutation of such machines at all loads and speeds.

When current is applied to such a machine, there is induced in the coils undergoing commutation a voltage due to the flux of the exciting field. These coils being short-circuited by brushes resting on the commutator, sparking is caused when the motor is allowed to rotate. As the motor draws a heavy current at starting the series field is a maximum and a maximum voltage will be induced in the coils undergoing commutation during this period. If we consider that the voltage across the motor terminals is raised step by step as the motor is allowed to accelerate, the relatively high voltage induced in the coils undergoing commutation will persist until after full voltage is applied across the motor terminals and the motor current is allowed to decrease. By my invention I provide simple and reliable means for generating in the coils undergoing commutation a voltage that will oppose the voltage induced in the same coils by the motor current and means for varying the generated voltage substantially inversely as the speed of the motor during starting.

In carrying my invention into effect in one form, I provide an alternating current single phase commutator motor with highly inductive windings for the commutating poles supplied from the same source as the motor and means for varying the strength of the commutating field substantially inversely as the speed of the motor during starting.

Figure 1:
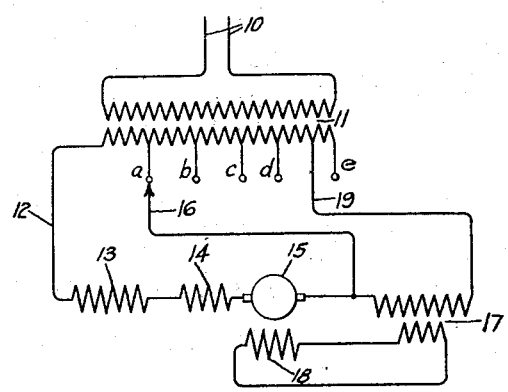
Figure 2:
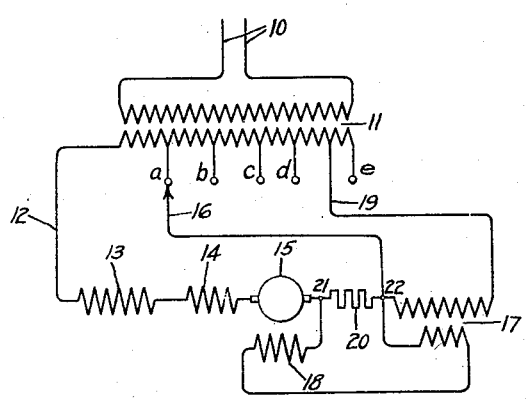

The features of my invention which are believed to be new and patentable will be pointed out in the claims appended hereto. For a better understanding of my invention reference is made in the following description to the accompanying drawings in which Fig. 1 shows one arrangement of the apparatus of my invention especially suitable for series commutator motors having frequent and heavy starting duties. Fig. 2 shows a form of my invention which is more suitable for general purposes.

Referring to Fig. 1, 10 represents an alternating current supply system supplying through transformer 11 a single phase series commutator motor. The compensating winding 13, the exciting winding 14 and the armature 15 of the motor are connected in series. One side of the compensating winding is connected to one side of the secondary of the main transformer 11 by the permanent connection 12. The other side of the motor has an adjustable connection 16 which may be moved across the taps $a$, $b$, $c$, $d$ and $e$ of the secondary of the main transformer 11. I have represented an auxiliary transformer 17 having one side of its primary connected to the secondary of the main transformer 11 by the permanent connection 19. The other side of the auxiliary transformer 17 is connected to the secondary of the main transformer 11 by means of the adjustable lead 16. The secondary of the auxiliary transformer 17 is connected in series with the commutating field winding 18.

Consider now the conditions when the motor is started by moving the lead 16 from tap $a$ across the taps $b$, $c$, $d$, and $e$ of the secondary of the main transformer 11. It is well known that a motor draws a heavy current during starting. If the motor has series excitation it becomes desirable to increase the strength of the commutating field poles during this period. When the motor is energized with the adjustable lead 16 at the position $a$ for starting the motor will draw a heavy current. At this time the maximum voltage is impressed on the auxiliary transformer thus impressing a maximum voltage on the commutating field pole winding 18. The current flowing in the field winding 14 of the motor induces a voltage in the coils of the armature 15 which are short circuited by the brushes and the induced voltage in these armature coils lags behind the motor current by approximately 90 degrees. The current in the commutating pole winding will set up a flux and the voltage generated by the rotation of the coils undergoing commutation due to the flux of the commutating field is approximately in phase with the current in the commutating winding. Thus by making the commutating field winding highly inductive so the current will lag by approximately 90 degrees and by supplying the commutating field pole with a current from the motor supply source a voltage will be generated in the commutating zone that will oppose the "transformer" voltage induced in the same coils due to the current in the motor field winding 14.

It will be noted from the diagram that as the speed of the motor is increased by moving the adjustable lead 16 from tap $a$ across the taps $b$, $c$ and $d$ to the lead 19, the voltage impressed on the primary of the auxiliary transformer 17 will be decreased, thus decreasing the strength of the commutating field. When the lead 16 is moved to lead 19 the primary of the auxiliary transformer 17 will be short-circuited. If it is desirable to impress a constant voltage on the primary of the auxiliary transformer 17 after the motor has been brought up to its normal running speed, an additional tap $e$ is provided so that when the lead 16 is moved to the tap $e$, a constant voltage is impressed on the primary of the auxiliary transformer 17. It will be noticed that as the lead 16 is moved to tap $e$ the polarity of the primary of the auxiliary is reversed. In particular cases this may be necessary to prevent an excessive current from being induced by the armature in the short circuited commutating pole winding.

My invention as arranged in the drawing, Fig. 1, and explained above is especially suitable for motors subject to heavy and frequent starting duty. The arrangement shown in Fig. 2 represents the preferred form of my invention for general purpose motors. According to this arrangement, the motor is started in the same way as explained in connection with Fig. 1 and as will be noted from the diagram and above explanation, the strength of the commutating field is varied inversely as the speed of the motor during starting, but the arrangement as illustrated in Fig. 2 has the additional advantage of having the commutating pole current vary as a function of the motor current. This result is obtained by inserting a resistance 20 in series with the motor and shunting the commutating pole winding across this resistance at the positions 21 and 22. It will be noted that the voltage impressed on the primary winding of the auxiliary transformer 17 will be varied inversely as the speed of the motor as determined by the position of lead 16. When lead 16 is moved to position 19 the primary of the auxiliary transformer will be short-circuited, and the strength of the commutating field will vary only as the current in the motor varies. Under this arrangement as illustrated in Fig. 2 the commutating pole voltage is made the sum of two voltages; one an inverse function of the motor speed, the other a function of the motor current which combination will enable good commutation to be obtained over a wide range of speed and current. Other parts of my invention shown in Fig. 2 are identical with those in Fig. 1 and I have them similarly numbered.

In accordance with the provisions of the patent statues, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. An arrangement for improving the commutation of alternating current single phase series motor comprising in combination with such a motor and a source of alternating current supply, a transformer having its primary energized from the source of supply for said motor, an inductive commutating pole field winding for said motor connected in series with the secondary of said transformer, and means for varying the strength of said commutating pole field winding inversely as the voltage applied to the motor during starting.

2. An arrangement for improving the commutation of alternating current single phase series motors comprising in combination with such a motor, an alternating current supply system, a transformer having its primary energized from the alternating current supply system, an inductive commutating field winding connected in series with the secondary of said transformer, said transformer serving to supply said commutating field winding with a current of sufficient magnitude and phase relation with respect to the motor current as will cause a voltage to be generated in the coils undergoing commutation for neutralizing the voltage induced by the series field of the motor in the same coils, means for varying the commutating field winding voltage inversely as the voltage applied to the motor during starting and means for causing the strength of the commutating field to vary as a function of the motor current during running speeds.

3. An arrangement for improving the commutation of alternating current single phase motors, comprising in combination with such a motor and a source of alternating current supply two motor connections, one of which is adjustable for varying the voltage applied to the motor, a transformer having one side of its primary connected to the alternating current supply by a stationary connection, the other side being connected through said motor adjustable connection, a commutating pole field winding for said motor connected in series with the secondary of said transformer, said motor adjustable connection being so arranged that as the voltage impressed on the motor is increased the voltage of the commutating pole field winding is decreased.

4. An arrangement for improving the commutation of alternating current single phase motors, comprising in combination with such a motor and a source of alternating current supply, two motor connections for connecting the motor to the supply source, one of which is adjustable, a resistance connected in the motor circuit, a transformer having its primary energized from the source of supply for said motor, one side of the primary of said transformer being connected to the supply system through said motor adjustable connection, a commutating pole field winding for said motor connected in series with the secondary of the transformer and said resistance in the motor circuit, said motor adjustable connection being so arranged that as the voltage impressed on the motor is increased the voltage on the primary of the transformer is decreased.

5. In combination with a source of alternating current a commutator motor provided with a commutating pole field winding and common means for substantially increasing the voltage supplied to said motor and decreasing the voltage supplied to said commutating pole winding from said source.

6. An arrangement for improving the commutation of alternating current single phase series motors comprising in combination with such a motor and a source of alternating current supply, two motor connections, one of which is adjustable for varying the voltage applied to the motor, a transformer having one side of its primary connected to the alternating current supply by a stationary connection, the other side being connected through said motor adjustable connection, a commutating pole field winding for said motor connected in series with the secondary of said transformer, said motor adjustable lead being so arranged that as the voltage impressed on the motor terminals is increased up to a given point the voltage on the primary of the transformer is decreased and means for reversing the polarity of the primary of said transformer and increasing the voltage impressed thereon as the voltage of the motor terminals is increased beyond said point.

In witness whereof, I have hereunto set my hand this 31st day of January, 1929.

FELIX KONN.